United States Patent [19]

Pfeiffer et al.

[11] 4,151,906
[45] May 1, 1979

[54] INSTALLATION FOR THE PRODUCTION OF LAYERED PRESSED PANELS AND DECORATIVE PANELS

[75] Inventors: Heinrich Pfeiffer, Eppingen; Richard Brüssel, Sulzfeld, both of Fed. Rep. of Germany

[73] Assignee: Maschinenfabrik J. Dieffenbacher GmbH, Eppingen, Fed. Rep. of Germany

[21] Appl. No.: 767,319

[22] Filed: Feb. 10, 1977

[30] Foreign Application Priority Data

Feb. 10, 1976 [DE] Fed. Rep. of Germany ....... 2605141

[51] Int. Cl.² .............................................. B65G 57/04
[52] U.S. Cl. .................................... 198/421; 198/631; 198/812; 198/832; 271/191
[58] Field of Search ............... 198/631, 421, 471, 485, 198/585, 594, 606, 812, 832; 100/215; 271/191, 73, 67

[56] References Cited

U.S. PATENT DOCUMENTS

| | | | |
|---|---|---|---|
| 2,661,948 | 12/1953 | Montgomery | 198/485 |
| 2,704,593 | 3/1955 | Galloway | 198/421 |
| 3,062,354 | 11/1962 | Tiefenthal | 198/471 |
| 3,106,280 | 10/1963 | Baker | 198/812 |
| 3,150,761 | 9/1964 | Pinault et al. | 198/812 |
| 3,294,257 | 12/1966 | Davies et al. | 198/631 |
| 3,324,987 | 6/1967 | Kiesser | 198/631 |
| 3,370,693 | 2/1968 | Marsden | 198/815 |
| 3,556,280 | 1/1971 | Schnee et al. | 198/812 |
| 3,603,463 | 9/1971 | Billett et al. | 198/421 |
| 4,027,806 | 6/1977 | Weihmuller | 198/362 |

FOREIGN PATENT DOCUMENTS

| | | | |
|---|---|---|---|
| 1556022 | 1/1970 | Fed. Rep. of Germany | 198/812 |
| 2140708 | 2/1972 | Fed. Rep. of Germany | 198/585 |
| 2544066 | 4/1976 | Fed. Rep. of Germany | 198/421 |
| 224299 | 1/1969 | Sweden | 198/631 |
| 1029608 | 5/1966 | United Kingdom | 198/421 |

*Primary Examiner*—Robert W. Saifer
*Assistant Examiner*—Richard K. Thomson
*Attorney, Agent, or Firm*—Joseph A. Geiger

[57] ABSTRACT

An installation for the production of layered pressed panels and decorative panels, having a panel layer assembly unit and a transversely arranged press pack feeding unit, each unit featuring a horizontally extendable start-stop conveyor with a movable transfer frame whose belt guide rolls define an S-shaped belt run. The latter, while carrying a press pack, is extended over the receiving press pack feed conveyor, or panel press table, respectively, whereupon it is retracted from under the press pack, thereby gently depositing the latter, while belt clamps hold the conveyor belt in place, as the next assembly cycle takes place. The assembly of a press pack is performed by one or more layer collecting lines which pick up panel layers from layer stacks on opposite sides of the collecting conveyor of the layer assembly unit.

8 Claims, 4 Drawing Figures

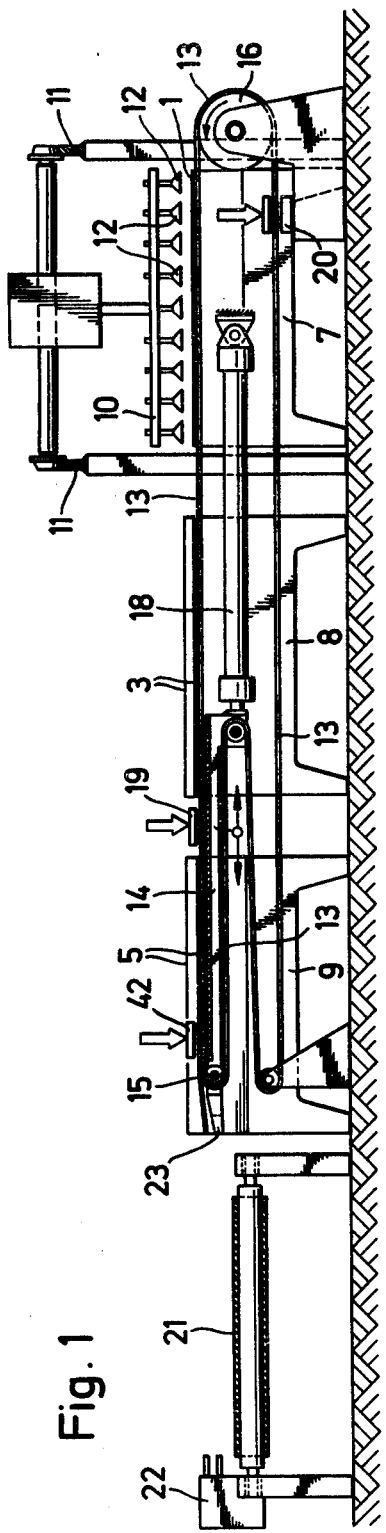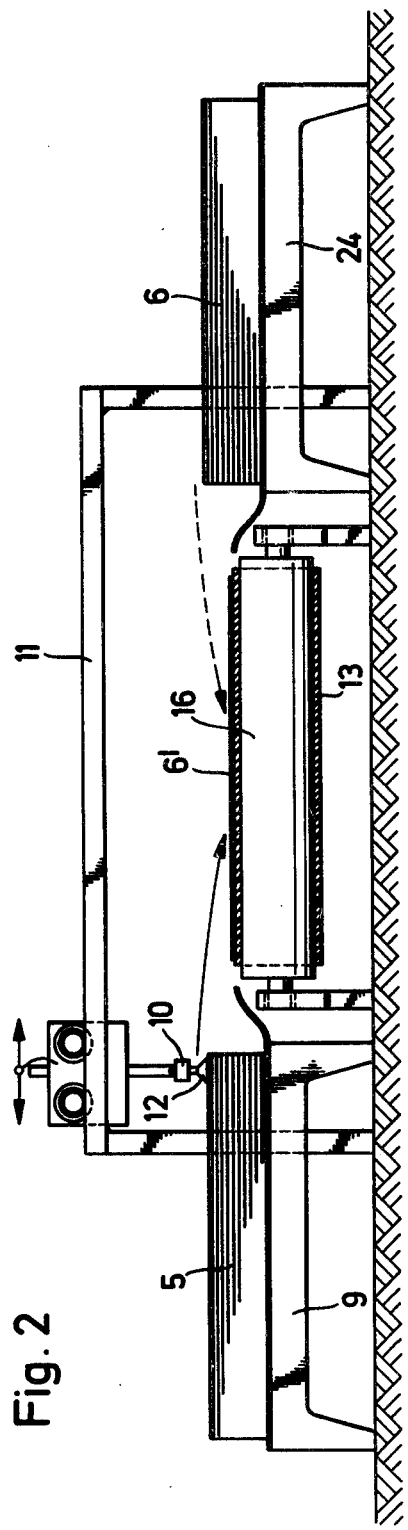

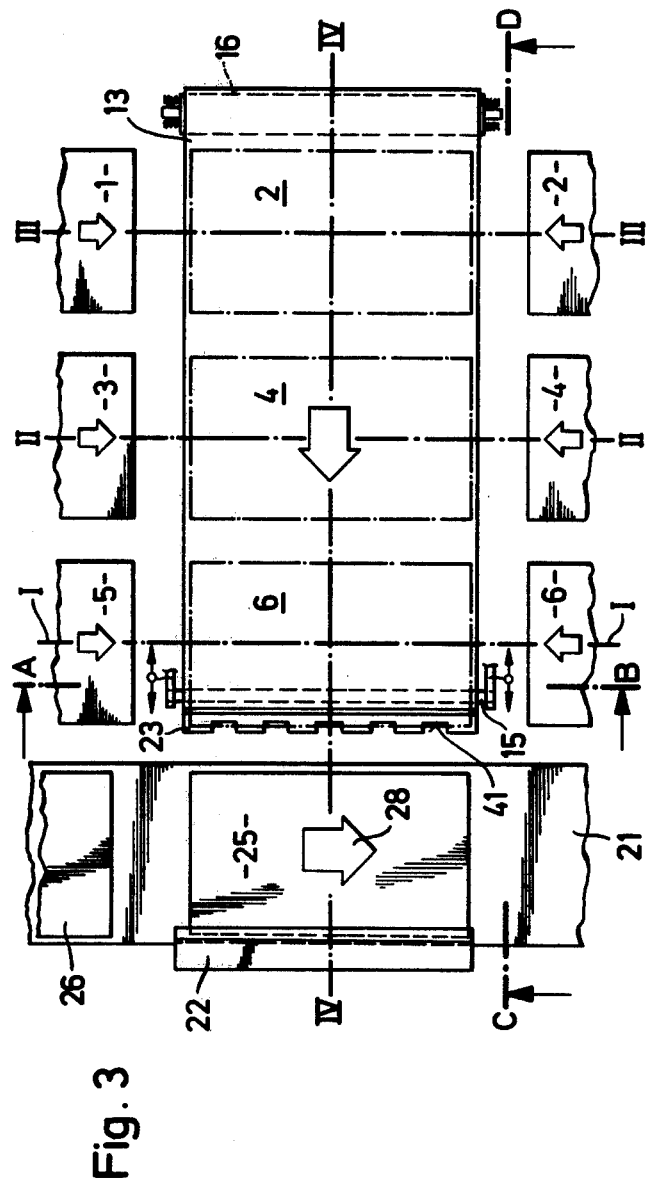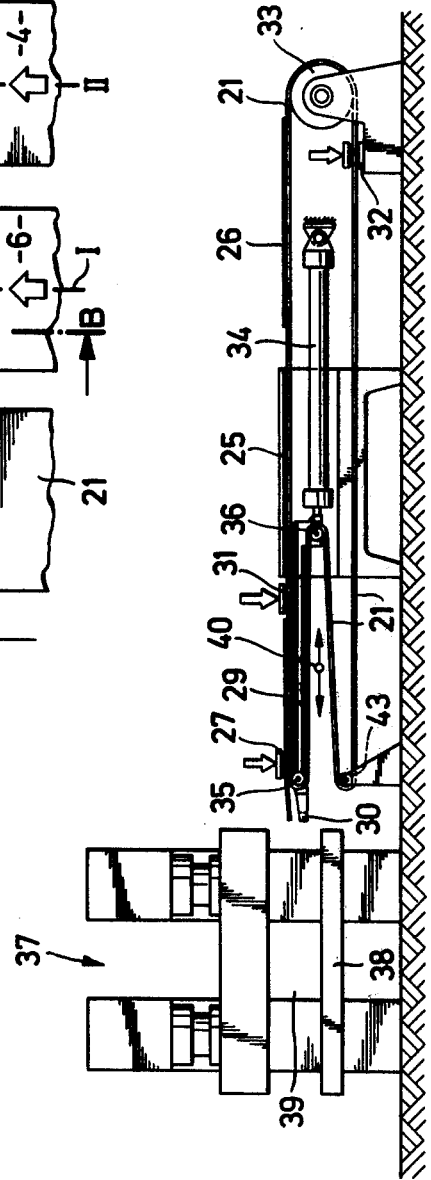

INSTALLATION FOR THE PRODUCTION OF LAYERED PRESSED PANELS AND DECORATIVE PANELS

BACKGROUND OF THE INVENTION

1. Field of the Invention

The present invention relates to panel production machinery, and, more particularly, to an installation for the production of layered pressed panels and decorative panels, or for the application of coated paper sheets, liners, veneer sheets, plastic films, etc., to panels of chipboard, fiber, metal, plastic, or plywood, the installation consisting essentially of a layer assembly unit, a press pack feeding unit, and a panel press.

2. Description of the Prior Art

In recent years, both the variety of pressed panels, in terms of their composition, and the application possibilities for such pressed panels have undergone rapid increase and growth. As competitive pressures dictate the search for ever greater production economies through mechanization, it becomes necessary to employ layer assembly units and press pack feeding units of increasing speed and efficiency, in order to fully utilize the capacity of a modern panel press of single-level or multi-level construction. At the same time, such an installation must be quickly adaptable to the production of a large variety of layered pressed panels and for the veneering, or application of overlay materials to carrier panels, for the production of veneer panels, panels of chipboard, fiber, or plywood construction panels, plastic panels, and even metal panels.

Known installations of this kind operate either semi-automatically or fully automatically, using vertically movable suction carriages, supported on overhead rails, which move over the layer stacks, pick up one layer at a time with the aid of suction heads, and carry it to an assembly table, where the layer is deposited. The assembled press pack is then transferred from the assembly table to a press pack feeding station, where it is introduced into the panel with a by means of a roller conveyor, or belt conveyor, or with the aid of transfer panels of sheet metal.

Another, more advanced layer assembly device is disclosed in U.S. Pat. No. 3,914,154, the device featuring a collecting carriage on overhead rails which moves from layer stack to layer stack on a row of stack tables. At the edge of each stack table is arranged a stationary edge lifting device with a vertically movable suction bank which raises the edge of the uppermost panel layer, while a horizontal collecting palette of the collecting carriage, with partially assembled press pack, slides under the raised layer.

In order to avoid damaging the thin panel layers during collection, particularly in the case of very large panel dimensions, it has become necessary to completely mechanize the layer collecting procedure. This means that complex and expensive machinery is required for the layer collection line, or lines, as well as for the press pack transfer unit which feeds the assembled layer packs to the panel press. Nevertheless, the time for assembling and transferring a complete press pack may be too long, in comparison to the pressing cycle of a modern panel press. This is particularly so in the case of layered pressed panels which may be composed of up to eight different layers, in order to obtain the desired coloring, surface pattern and/or mechanical characteristics, or in the case of chipboard panels which may have to be covered with up to three outer layers on each side. A similar discrepancy between the cycle duration of the press and that of the layer collecting and press pack transfer machinery exists, when the panel press is of the so-called rapid cycling type which is capable of pressing several successive press packs simultaneously.

SUMMARY OF THE INVENTION

Underlying the present invention was the primary objective of improving upon the prior art in this field, by devising layer collecting and press pack transfer machinery, in conjunction with an installation for the production of layered pressed panels and decorative panels, which allows faster assembly of the press packs from a plurality of layer stacks and transfer of the assembled press packs either to the press table of a single-layer panel press, or to the transfer rack of a mutli-level panel press, or to the stages of a rapid cycle panel press, at a rate which corresponds to the duration of the pressing cycle of the panel press.

The present invention proposes to attain this objective by suggesting an improved installation for the production of layered pressed panels and decorative panels which features a layer assembly unit and a press pack feeding unit which both utilize a start-stop conveyor with a horizontally extendable and retractable transfer frame which, by its fore and aft motion, advances a panel layer carrying conveyor belt, or retracts that belt from under the panel layer, or the press package, respectively, after the latter has been moved into a position above the previously assembled panel layers, or above the press table, respectively.

In a preferred embodiment of the invention, the layer assembly unit and the press pack feeding unit are arranged at right angles to each other and are driven synchronously, so that, while a layer collecting device, or a plurality of layer collecting devices, deposit a panel layer on the conveyor belt of the press pack feeding line, the latter inserts a complete press pack into the panel press.

The layer transfer from the layer collecting device to the press pack feeding unit, and the press pack transfer from the latter to the panel press are accomplished rapidly and smoothly by means of a suggested novel extendable conveyor belt. The latter, carrying a panel layer, or an assembled press pack, respectively, can be advanced or retracted horizontally by means of a transfer frame carrying belt guide rollers defining an S-shaped belt run. In the extended position of the transfer frame, the latter and its S-shaped belt run are extended above the place where the layer or press pack is to be deposited. The subsequent retraction of the transfer frame removes the extended belt portion from under the panel layer or press pack, without horizontally moving the latter, thereby gently depositing it on the press pack feed conveyor run below, or, in the case of the press pack feed unit, on the press table, for example.

In a suggested preferred embodiment, the extendable and retractable transfer frame is connected to an extension cylinder, a cooperating conveyor drive drum being provided on the opposite end of the stop-start conveyor. On the upper and lower strands of the conveyor belt are arranged belt clamps; a panel layer clamp, or press pack clamp, respectively, is arranged on the movable transfer frame.

This novel layer handling device offers a number of important advantages over prior art solutions in this field: As a result of the virtual elimination of all sliding friction during the transfer procedure, it becomes possible to greatly accelerate the speed of the transfer movements. Because the transfer itself takes place while the upper strand of the conveyor belt is held still, it is possible to simultaneously initiate other assembly or transfer maneuvers, eliminating dead time and empty return movements in the process.

Further advantages of the present invention reside in the fact that the mechanism of the extendable belt conveyor can be of light weight construction, thereby not only saving operating energy, but also making it possible to operate the device at relatively elevated acceleration and deceleration rates. The drive means, in the form of a drive cylinder and a cooperating drive drum, being stationary, are without influence on the acceleration characteristics of the transfer frame.

The novel press pack feeding device also lends itself for coordination with a multi-level panel press, feeding press packs to a suitable press pack transfer rack. Similarly, it can also be advantageously used in connection with a rapid cycle press, where the timing is very important, even down to seconds.

In connection with press packs which are composed of a large number of separate layers, the present invention further suggests a layer assembly configuration which permits the simultaneous collection of a plurality of panel layers, using several layer collecting lines which deposit panel layers on the press pack assembly line over whose assembly table runs the press pack feeding conveyor. The latter thus advances step-by-step through a succession of layer collecting stations, each being served by a layer collecting line which removes panel layers from stack tables which are arranged on opposite sides of the collecting stations. These layer collecting devices operate simultaneously, so that it is possible to deposit on the layer assembly line the full number of panel layers during each operating cycle. Alternatively, it is possible to operate the layer assembly device in such a way that each layer collecting line successively deposits two layers in its collecting station, picking up one layer from a stack on one side of the collecting station, and the other layer from a stack on the opposite side.

Still another suggestion of the present invention relates to the arrangement of a clamping device on the movable transfer frame which holds down the leading edge of a panel layer, or of an assembled press pack, respectively, as the layer or press pack is accelerated forwardly. This eliminates the risk of a thin panel layer becoming partially airborne, at the elevated speed of conveyor movement. Under certain circumstances, it may be desirable to provide panel layer edge clamps on the conveyors for each layer, partial press pack, or complete press pack. Such clamping means are then preferably arranged on the longitudinal edges of the panel layers or press packs.

Another problem encountered in connection with the assembly of panel layers of large dimensions relates to the possibility that some layers in an assembled press pack may shift in relation to others, due to the weight of the press pack which causes a downward deflection of the conveyor belt. Such shifting may create wrinkles in some very thin panel layers. The present invention therefore further suggests that, for large panel dimensions, the conveyor belt be supported from underneath by a supporting conveyor with appropriate supporting rolls. Alternatively, a large conveyor belt may be supported from underneath by applying against it a stream of compressed air which acts as a supporting air cushion.

In order to obtain an accurate positioning of the transferred panel layers in a collecting station, or of a press pack on the press table or multi-level transfer rack, respectively, the present invention further suggests the arrangement of a transfer ledge on the forward extremity of the extendable start-stop conveyor. This ledge is arranged ahead of the forward belt guide roll and is so arranged that it supports the forward extremity of a panel layer or press pack. The shape of the transfer ledge resembles that of a saw blade, having a series of tooth-like recesses in its forward edge. Into these recesses engage suitable tooth-shaped members of an edge clamping device by means of which the panel layer or press pack is held in place, as the extendable conveyor is withdrawn from underneath the panel layer or press pack, through retraction of the transfer frame.

The matrix-type arrangement of the layer assembly unit in relation to the press pack feeding unit offers a still further advantage, inasmuch as it lends itself readily to expansion, when it becomes necessary, for example, to provide additional panel layer collecting lines, or more than one press pack feeding unit in conjunction with a panel press.

BRIEF DESCRIPTION OF THE DRAWINGS

Further special features and advantages of the invention will become apparent from the description following below, when taken together with the accompanying drawings, which illustrate, by way of example, a preferred embodiment of the invention, represented in the various figures as follows:

FIG. 1 is a schematic representation of an installation embodying the invention, showing particularly its panel layer assembly unit, as seen in an elevational cross section taken along line C–D of FIG. 3;

FIG. 2 shows the layer assembly unit of the installation in a transverse cross section taken along line A–B of FIG. 3;

FIG. 3 shows the installation of the invention in a plan view; and

FIG. 4 is a schematic elevational view of the press pack feeding unit of the installation embodying the invention.

DESCRIPTION OF THE PREFERRED EMBODIMENT

The drawings illustrate schematically an installation for the production of layered pressed panels and decorative panels, or for the application of coated paper sheets, liners, veneer sheets, plastic films, etc., to panels of chipboard, fiber, metal, plastic, or plywood, reference numerals 1–20 designating a panel layer assembly unit, reference numerals 21–30 designating a press pack feeding unit, and reference numeral 37 designating a panel press.

The central mechanism of the panel layer assembly unit and of the press pack feeding unit is a horizontally extendable start-stop conveyor 13 or 21, respectively, which features an extendable and retractable transfer frame 14 or 29, respectively. In the case of the layer assembly unit, the start-stop conveyor 13, when standing still, conveniently provides one or several collecting stations for the assembly of a given number of different panel layers into a press pack.

As can best be seen in FIGS. 2 and 3, the start-stop conveyor 13 has arranged on opposite sides thereof a number of stack tables 7, 8, 9, and 24, carrying stacks of different layer sheets 1, 2, 3, 4, 5, and 6. These stack tables are arranged in successive rows of two opposite tables each, defining layer collecting lines I—I, II—II, and III—III. (FIG. 3).

Each layer collecting line has arranged above it a suction bank 10, mounted on a carriage which is guided on overhead rails 11 that run parallel to the layer collecting line. The suction bank 10 has at its lower extremity a number of suction heads 12 which, when activated, are capable of lifting the edge portion of the uppermost panel layer, e.g. layer 5, and which, when the suction bank 10 is moved over the start-stop conveyor 13, pull the partially raised panel layer 5 into the collecting station on top of the conveyor 13.

As FIG. 2 indicates, the suction bank 10 is capable of picking up panel layers from either the stack table 9 or the stack table 24. When programmed for alternating pickup from opposite sides of the collecting station, the suction bank 10 has to execute only a very short motion beyond the point of release of a deposited panel layer to reach the edge of another panel layer on the opposite side of the collecting station. A complete press pack, consisting of the desired number and sequence of panel layers, can thus be assembled automatically, as the start-stop conveyor 13 advances intermittently from collecting station to collecting station, towards the press pack feed conveyor 21. A press pack is complete, when the suction bank 10 of the layer collecting line I—I has deposited the last panel layer in its collecting station.

The start-stop conveyor 13 executes an intermittent stepping motion at the same time as its transfer frame 14 is extended forwardly over the press pack feed conveyor 21. As FIG. 1 indicates, the transfer frame 14 carries small front and rear belt guide rolls which, together with a small stationary belt guide roll underneath the transfer frame, define an extendable S-shaped belt run. As the transfer frame 14 is extended forwardly, through the action of an extension cylinder 18, a drive drum 16 at the rear extremity of the start-stop conveyor 13 cooperates with the transfer frame 14 so that both the latter and all the panel layers already deposited on the conveyor 13 advance one step towards the conveyor 21. The length of one step is equal to the distance between two collecting stations.

The extended conveyor 13 holds a complete press pack 25 suspended above the conveyor 21. Now, the transfer frame 14 is retracted through activation of the cylinder 18, while the start-stop conveyor 13 remains in place. Only the intermediate portion of the S-shaped belt run is retracted, being rolled away from underneath the press pack 25 which is thereby gently deposited onto the press pack feed conveyor 21.

In order to assure a fixed position of the conveyor 13 during this transfer procedure, for the purpose of obtaining an accurate positioning of the press pack on the conveyor 21, the start-stop conveyor 13 has arranged on its upper and lower belt runs belt clamps 19 and 20, respectively. A layer hold-down clamp 42 arranged on the transfer frame 14, or on the endless belt of the conveyor 13, serves to prevent any shifting of panel layers on the complete press pack 25 and to counteract any tendency of the top layer to become partially airborne, when the conveyor is advanced at an elevated speed, for high production output.

At the forward extremity of the extendable belt conveyor 13, as part of the movable transfer frame 14, is further arranged a transfer ledge 23 which forms a short extension support for the press pack 25 beyond the forward belt guide roll 15 of the S-shaped belt run. As FIG. 3 indicates, the transfer ledge 23 has a shape resembling that of a saw blade, with a series of tooth-like recesses 41 underneath the edge of the press pack 25. In the transfer position above the press pack feed conveyor 21, the forward edge of the press pack can thus be grabbed by means of suitable clamping teeth of an edge clamping device 22 of the press pack feeding unit (FIG. 1).

While it is advantageous for the installation of the invention to have the layer assembly unit deposit completed press packs 25 directly onto the transversely moving press pack feed conveyor 21, it is also possible to arrange the layer assembly unit in such a way that it deposits the completed press packs directly into the levels of a multi-level panel press, or into a transfer rack for such a press, or even onto suitable carrier means which can be moved to some place for storage.

It is also possible to perform a part of the layer assembly operation on the press pack feed conveyor 21, especially when a heavier carrier panel 26 (see FIG. 4) is to be joined with a collection of thin outer panel layers, which have previously been assembled into a partial press pack by the layer assembly unit. In this case, the last collecting station is simply shifted onto the press pack feed conveyor 21, from where the complete press pack is advanced towards the panel press in the direction of the arrow 28. Alternatively, it is also possible to introduce carrier panels in the layer collecting line II—II. With such an arrangement, a press pack may consist of one or more bottom layers collected in the layer collecting line III—III, a heavy carrier panel deposited by the layer collecting line II—II, and one or several top layers collected by the layer collecting line I—I.

FIG. 4 shows the press pack feeding unit with its extendable start-stop conveyor 21, which is similar to the previously described conveyor 13 of FIGS. 1–3. Again, the forward portion of the conveyor has an S-shaped belt run, carried by an extendable and retractable transfer frame 29 which is connected to an extension cylinder 34. Two stationary belt clamps 31 and 32 cooperate with the upper and lower belt runs, respectively, while a press pack holddown clamp 27 is arranged near the forward edge of the transfer frame 29. The forward extremity of the latter is again formed by a transfer ledge 30 with recesses similar to those of the transfer ledge 23 of FIG. 3.

As in the case of the start-stop conveyor 13 of the layer collecting unit, the start-stop conveyor 21 of the press pack transfer unit can be extended forwardly, through an extension stroke of the cylinder 34, so that the transfer frame 29, carrying a press pack 40, reaches into the work gap 39 of a panel press 37, just above the lower work table 38. The holddown clamp 27 secures the press pack 40 on the conveyor 21 during the insertion movement, and the belt drive drum 33 assists in the advancing movement of the belt itself. The two belt clamps 31 and 32 are open during the advancing stroke.

The transfer of the press pack 40 onto the press table 31 is accomplished by retracting the transfer frame 29, so that the S-shaped belt run is withdrawn from underneath the press pack 40, thereby gently depositing the latter onto the work table 38. During this time, the belt clamps 31 and 32 block the conveyor belt against movement.

While it is advantageous, for the achievement of high production rates, to have a rapid extension movement of the start-stop conveyors 13 and 21, respectively, the depositing step, i.e. the retraction movement can be gentle and slow, as this step can take place while a new cycle of panel layer collection takes place.

While the upper conveyor belt clamps 19 and 31 of the conveyors 13 and 21 have been described as being stationary, it is also possible to provide these clamps as parts of the extendable transfer frame 14 or 29, respectively, in which case the clamps also serve as holddown clamps for the panel layers or press packs, respectively. With such movable belt clamp on the transfer frames 14 and 29, it is possible to use the extension cylinders 18 and 34, respectively, to advance the conveyor belts 13 and 21 by pulling them forwardly with the aid of the transfer frames. For the return movement of the transfer frames 14 and 29, the movable belt clamps 19 and 31 are released and the stationary belt clamps 20 and 32 are closed.

It should be understood, of course, that the foregoing disclosure describes only a preferred embodiment of the invention and that it is intended to cover all changes and modifications of this example of the invention which fall within the scope of the appended claims.

We claim the following:

1. In an installation for the production of layered pressed panels and decorative panels, or for the application of coated paper sheets, liners, veneer sheets, plastic film, etc., to panels of chipboard, fiber, metal, plastic, or plywood, in which installation press packs are assembled from a plurality of panel layers which are collected from separate layer stacks, for subsequent pressing and curing in a panel press, in such an installation, panel layer handling machinery comprising in combination:

a layer assembly unit which includes a collecting conveyor in the form of a horizontally extendable flat belt conveyor, with an endless conveyor belt having an upper belt run which defines at least one panel layer collecting station; and a press pack feeding unit which includes a feed conveyor which likewise has the form of a horizontally extendable flat belt conveyor with an endless conveyor belt having an upper belt run extending transversely to the collecting conveyor, near the forward extremity of the latter and at a level a short distance below the level of the upper belt run of the collecting conveyor; and wherein at least one of said two horizontally extendable flat belt conveyors has in its forward portion a forwardly extendable and retractable transfer frame on which are mounted two small belt guide rolls which, together with a stationary belt guide roll arranged underneath the transfer frame, define an S-shaped conveyor run portion of low height at the forward end of the conveyor, so that a displacement of the transfer frame results in a corresponding extension or contraction of the upper belt run, without change in belt tension;

said conveyor with the transfer frame includes a clamp which is mounted on the transfer frame so as to be movable therewith, said movable clamp, when actuated, serving as a hold-down clamp for the panel layers by clamping the latter against the conveyor belt, while also serving as a belt clamp by simultaneously clamping the conveyor belt against the transfer frame, thereby causing the conveyor belt to move with the transfer frame;

said same conveyor also includes a stationary belt clamp arranged at a place along the endless conveyor belt which is located outside the extendable S-shaped belt run portion; and said same conveyor further includes means for extending and retracting the transfer frame, and means for advancing the conveyor step-by-step in a start-stop movement.

2. Panel layer handling machinery as defined in claim 1, wherein both the collecting conveyor and the feed conveyor have a retractable transfer frame, means for extending and retracting said frame, and means for advancing the conveyor; and each of said two conveyors further includes a drive drum at the rear extremity of the conveyor, as part of said conveyor advancing means.

3. Panel layer handling machinery as defined in claim 2, wherein the transfer frame extending and retracting means of said conveyors includes a fluid-controlled linear actuator which is operatively connected to the transfer frame; and the machinery further includes, for each of said two conveyors, control means for actuating the drive drum to advance the conveyor belt at the same time as the transfer frame is extended by said linear actuator, and for holding the drive drum still, while the transfer frame is retracted by the linear actuator.

4. Panel layer handling machinery as defined in claim 1, wherein the transfer frame extending and retracting means and the conveyor advancing means of said conveyor with the transfer frame are combined in the form of a double-acting fluid-controlled linear actuator which is operatively connected to the transfer frame.

5. Panel layer handling machinery as defined in claim 1, wherein the layer assembly unit further includes:

at least one collecting station defined by the upper belt run of the collecting conveyor;

a plurality of layer stacks arranged laterally spaced from the collecting conveyor, in perpendicular alignment with said collecting station, or stations; and a layer collecting line associated with each collecting station and arranged transversely to the collecting conveyor, to extend to at least one layer stack; said collecting line including means for singulating a layer from a selected layer stack, and means for transferring the singulated layer to the collecting station of the line on the collecting conveyor.

6. Panel layer handling machinery as defined in claim 5, wherein the layer assembly unit has a plurality of evenly spaced collecting stations on the upper belt run of the collecting conveyor, and an equal number of layer collecting lines associated therewith;

the advancing means of the collecting conveyor is adjusted for a conveyor advance by steps which are equal in length to the distance between the collecting stations; and layer stacks are arranged on both sides of the collecting conveyor.

7. Panel layer handling machinery as defined in claim 6, wherein
at least some of the layer collecting lines have a plurality of layer stacks associated therewith and arranged on opposite sides of the collecting conveyor; and
each layer collecting line has a collecting carriage guided on overhead rails which extend over the collecting conveyor, to serve as its layer transferring means, and a suction bank mounted on the collecting carriage, to serve as its layer singulating means.

8. Panel layer handling machinery as defined in claim 1, wherein
the means for extending and retracting the transfer frames and the means for stepwise advancing the conveyors cooperate so as to produce a relatively more rapid conveyor advancing and transfer frame extending motion and a relatively slower transfer frame retracting motion.

* * * * *